United States Patent [19]

Girault

[11] Patent Number: 4,502,274
[45] Date of Patent: Mar. 5, 1985

[54] LUBRICATING AND COOLING SYSTEM FOR INTERSHAFT BEARING OF TURBOJET

[75] Inventor: Daniel G. Girault, Melun, France
[73] Assignee: S.N.E.C.M.A., Paris, France
[21] Appl. No.: 478,362
[22] Filed: Mar. 24, 1983

[30] Foreign Application Priority Data

Mar. 26, 1982 [FR] France ............... 82 05598

[51] Int. Cl.³ .............................................. F02C 7/06
[52] U.S. Cl. ................................... 60/39.08; 184/6.11; 184/6.26
[58] Field of Search ............... 60/39.08; 184/6.11, 184/6.26; 415/175, 176, 110; 111

[56] References Cited

U.S. PATENT DOCUMENTS

| | | | |
|---|---|---|---|
| 2,487,842 | 11/1949 | Whiteman et al. | 417/176 |
| 2,680,001 | 6/1954 | Batt . | |
| 2,702,093 | 2/1955 | Sherrill | 184/6.26 |
| 2,740,267 | 4/1956 | Bayard | 60/39.08 |
| 2,886,133 | 5/1959 | Mauck et al. | 60/39.08 |
| 2,986,433 | 5/1961 | Herrmann | 60/39.08 |
| 3,243,243 | 3/1966 | Diver et al. . | |
| 3,532,443 | 10/1970 | Johnson . | |
| 3,757,535 | 9/1973 | Stein | 184/6.11 |
| 3,915,521 | 10/1975 | Young . | |
| 4,080,783 | 3/1978 | Hamburg et al. | 60/39.08 |
| 4,265,334 | 5/1981 | Benhase, Jr. . | |
| 4,284,174 | 8/1981 | Salvana et al. | 184/6.26 |

FOREIGN PATENT DOCUMENTS

| | | |
|---|---|---|
| 1360906 | 4/1964 | France . |
| 1446066 | 6/1966 | France . |
| 2243366 | 9/1974 | France . |
| 759037 | 10/1956 | United Kingdom ............... 60/39.08 |

*Primary Examiner*—Louis J. Casaregola
*Assistant Examiner*—Timothy S. Thorpe
*Attorney, Agent, or Firm*—Oblon, Fisher, Spivak, McClelland & Maier

[57] ABSTRACT

A system for the distribution of atomized lubricating fluid includes a cylindrical ring placed upstream from an intershaft bearing of an inner shaft. The outer surface of the ring forms part of a labyrinth joint. Within the ring are cells open on the upstream surface of the ring, into which flows pressurized air. In the downstream end of each cell is an atomizing orifice directed toward the bearing. In the radially inner wall of each cell is an approximately radial bore. These bores cooperate with the means supplying lubricating fluid, which comprise radial bores in the wall of the inner shaft and emptying into a groove provided on the inner surface of the inner shaft. The groove receives lubricating fluid through fixed tubing that passes through the interior of the inner shaft.

8 Claims, 4 Drawing Figures

LUBRICATING AND COOLING SYSTEM FOR INTERSHAFT BEARING OF TURBOJET

BACKGROUND OF THE INVENTION

1. Field of the Invention

The invention concerns a lubricating and cooling device for intershaft bearings in turbomachines. It includes means for supplying consumable lubricating fluid and pressurized air, as well as means for distributing the atomized lubricating fluid.

2. Description of the Prior Art

There exist known systems for lubricating and cooling bearing blocks in the form of roller bearings turning at high speeds. More particularly, there exist devices that fulfill the lubricating function using either a mist of oil and pressurized air or a stream of oil that is then removed by the cooling air. Such known systems are described in French Pat. No. 1,235,469, where they perform lubrication of a roller bearing seated in a fixed housing. The housing contains two chambers: a peripheral chamber outside the bearing, and an axial chamber extending said bearing. The outer chamber receives compressed air through a channel connecting the axial chamber through openings into which the pressurized oil supply nozzles also run. Compressed air surrounds the stream of oil and prevents it from being atomized before it makes contact with the roller bearing. The oil-air mixture is evacuated after having crossed over the roller bearing. Such a system is adapted to a bearing placed between a fixed piece and a shaft, and cannot be used for a bearing lying between two shafts.

French Pat. No. 2,359,975 also deals with the lubrication of a bearing that supports the end of a turbine shaft. The outer ring of the bearing is seated in a fixed housing. The chamber defined between the end of the shaft and the seat is provided with an annular distributor that receives lubricating and cooling fluid and compressed air. The fluid used is fuel injected under pressure by the main pump. The air-fuel mixture is projected into the journal cavity of the bearing through the axial passages of the annular distributor. After cooling and lubricating the bearing, the mixture joins the engine exhaust gases through passages provided for this purpose. As in the first patent, the lubricating device described is applicable only to a bearing held within a fixed housing inside which or upon which the distributor of the lubricating fluid can be fastened.

SUMMARY OF THE INVENTION

According to the present invention, the system for distributing the atomized lubricating fluid includes a cylindrical ring placed upstream of the intershaft bearing on the inner ring, said shaft forming part of a labyrinth joint and defining a circumferentially spaced plurality of cells open on the upstream side, into which pressurized air flows. At the downstream end of each cell is an atomizing orifice oriented toward the bearing. In the radially inner wall of each cell is an approximately radial bore. These bores work in conjunction with device supplying the lubricating fluid, which consists of radial openings in the inner shaft and coaxial with the bores of the ring. Each of the bores in the inner shaft connects with a groove provided on the inner surface of the inner shaft. The grove receives lubricating fluid from a fixed tubing that runs through the interior of the inner shaft.

The system of the invention is particularly well-suited for lubricating and cooling, by use of consumable fluid, intershaft bearings placed between two shafts with different speeds of rotation, for example, shafts driving the low and high pressure rotor assemblies of a turbojet.

DETAILED DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
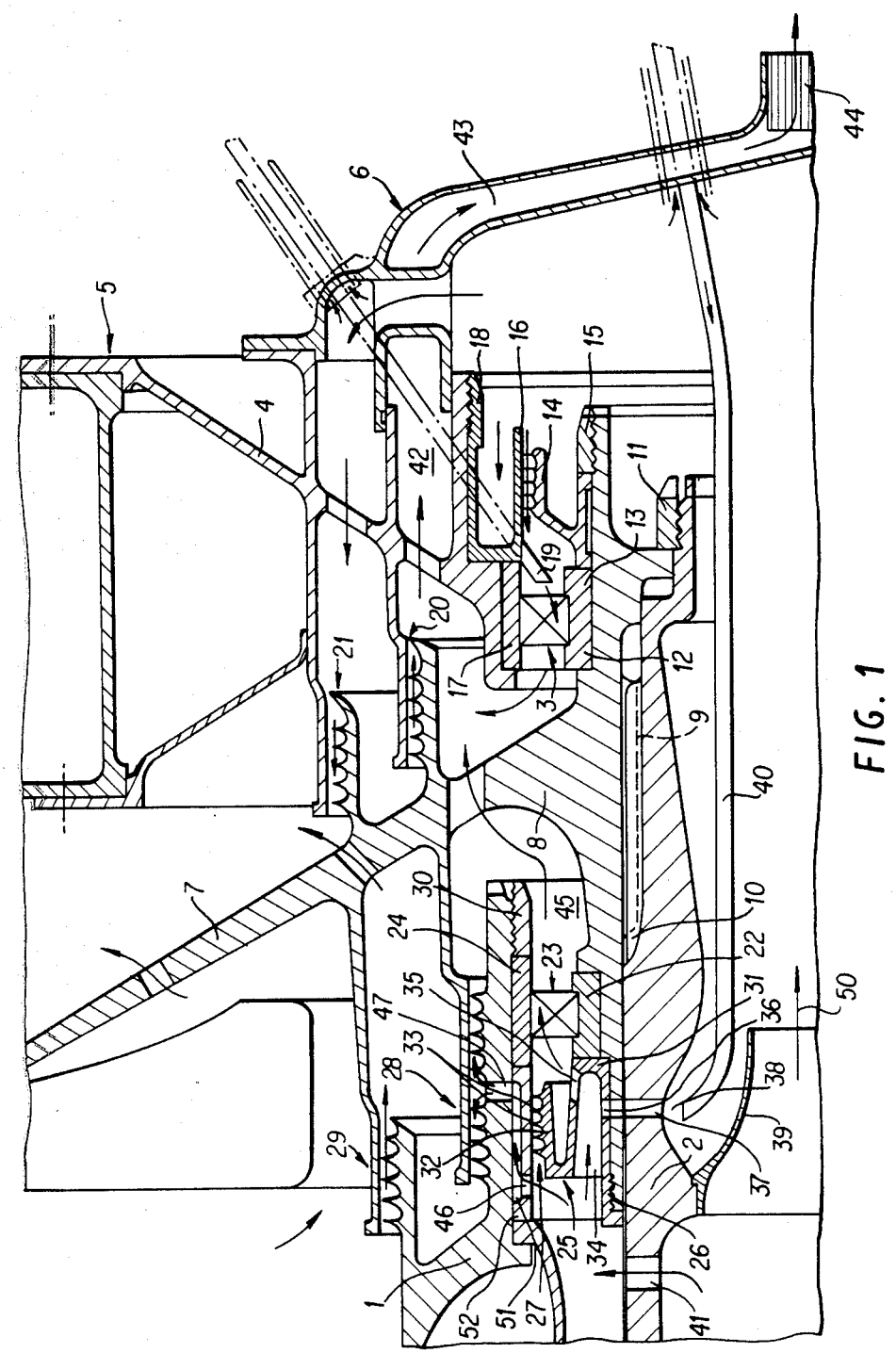
FIG. 1 shows an axial half-section of a part of a turbojet including means for lubricating and cooling a bearing placed between two shafts, in accordance with one embodiment of the invention.

FIG. 1 shows in axial half-section a part of a turbojet at the radial level of the shafts driving the low and high pressure rotor assemblies. Shaft 1 of the high pressure assembly is concentric with, and lies outside of, shaft 2 of the low pressure assembly. Gas flow is from left to right.

The end of shaft 2 of the low pressure assembly turns within bearing 3 held by support portion 4 of a stator deflector stage 5 closed off by an end housing 6. Rotor web 7 of the low pressure assembly has a boss 8 mounted in known fashion on the end of shaft 2. The radially inner periphery of this boss is equipped with axial teeth 9 splined in notches 10 on the end of shaft 2. The boss is held on the notches by a threaded collar 11.

A downstream end of boss 8 has a shoulder 12 against which abuts inner ring 13 of bearing 3, ring 13 being held in place by means of a labyrinth joint support ring 14 secured by a clamp ring 15. Labyrinth joint supporting 14 cooperates with the inner surface of a U-ring 16 that secures outer ring 17 of bearing 3. The assembly of rings 16 and 17 is secured by a stop collar 18 screwed onto the support portion 4 of the stator stage. Bearing 3 is lubricated through a known oil distributor 19 fastened within housing 6. Support 4 has cylindrical axial extensions that cooperate with corresponding extensions of rotor web 7, said extension having grooved surfaces forming labyrinth joints 20 and 21. These extensions and labyrinth joints 20 and 21 delimit spaces within which the control of pressures, and of the surfaces over which the pressures are exerted, contribute to the axial balancing of the rotors.

An upstream end of boss 8 has a shoulder against which rests inner ring 22 of bearing 23, the outer ring 24 of which is carried by an end of shaft 1 of the high pressure assembly. Inner ring 22 is secured in place by at least one portion of the lubricating part device 25 of the invention, and stop collar 26. The outer surface of the part 25 has crests 33 that, together with ring 52 fixed to the inner surface of shaft 1, form labyrinth joint 27.

The shaft 1 includes radial bores 47. The ring 52 includes radial bores 46. An annular recess 51 in ring 52 forms a passage communicating bores 46 and 47. Outer surfaces of the shaft 1 are designed to form labyrinth joints 28 and 29 in conjunction with the annular extensions of rotor web 7. Outer ring 24 of bearing 23 is held on the end of shaft 1 in known fashion by stop collar 30. It will be noted that, in the various spaces delimited by labyrinth joints 28 and 29, as in those mentioned above as being defined by joints 20 and 21, adjustments may be made in (1) the pressures prevailing in the spaces, for example through careful choice of the withdrawal stage, and (2) in the surfaces over which these pressures are applied, so as to cancel, or at least limit, the longitudinal forces acting on the high and low pressure rotor assemblies.

The gas tightness between the gas stream and the shafts is obtained by the labyrinth joints and by the counterpressure exerted by the flow of compressed air crossing the shafts and cooling them.

Lubricating device 25, in the embodiment shown in FIG. 1, includes means for distribution and atomizing the lubricating fluid. Said lubricating device 25 includes a cylindrical ring portion 31, the outer upstream edge of which supports a coaxial ring portion 32 whose outer surface has the crests that form part of labyrinth joint 27. Ring portions 31 and 32 may be integral with one another.

Figure 2:
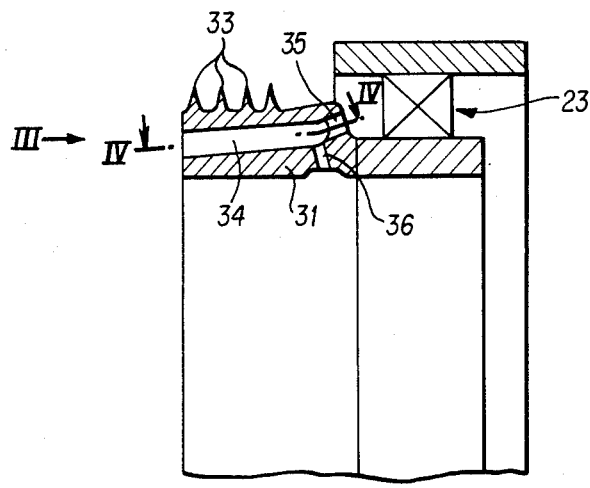
FIG. 2 is a half-view, in section, of a second embodiment of the invention.

According to a second embodiment shown in section in FIG. 2, the crests 33 are provided directly upon the outer surface of cylindrical ring portion 31. The shape of the ring portion chosen will depend upon the distance separating shafts 1 and 2.

Figure 3:
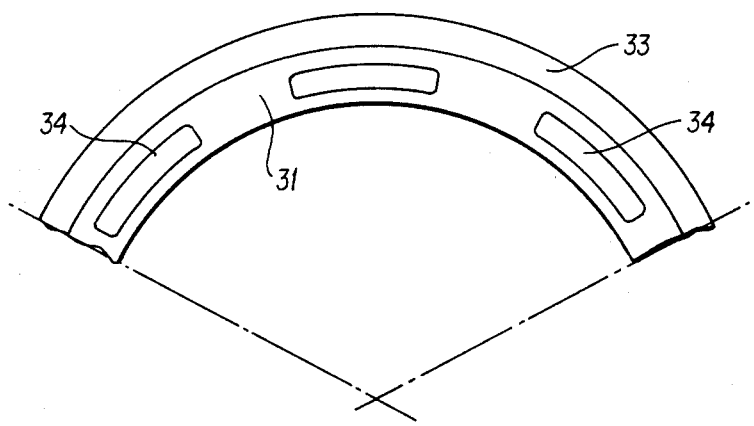
FIG. 3 is a partial view of FIG. 2 as seen along line III.
Figure 4:
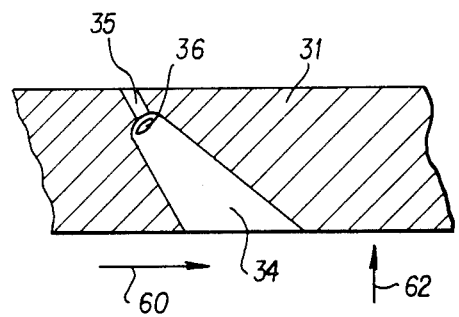
FIG. 4 is a view in perspective, and in section, as seen along line IV—IV of FIG. 2.

Cylindrical ring portion 31 defines cells 34 spaced along its circumference (FIGS. 1, 2 and 3). Cells 34 extend into the ring portion 31 and have lengths circumferentially inclined, relative to the shaft axes, in the direction opposite that of the rotation of the shafts, when viewed from upstream (arrow 62 of FIG. 4). The cells 34 are open on the upstream surface of the ring portion 31 and, at their downstream ends, are oriented toward the bearing 23.

The circumferential width of each cell 34 diminishes gradually toward its downstream end. An atomizing orifice 35, directed toward the bearing 23, is provided at or near the downstream end of each cell 34.

An essentially radial bore 36 made in the radially inner wall of the ring portion 31 for each cell 34 allows the cell to communicate with an arrangement for supplying the lubricating fluid. Said arrangement includes radial bores 37 provided in the wall of shaft 2 at positions coaxial with bores 36. These bores 37 open into a concave rounded annular groove 38 provided on the radially inner surface of shaft 2. A body of revolution 39, shaped approximately like a truncated cone, is fastened onto the upstream edge of the groove 38 to deflect the flow of cooling air passing into the axis of the shafts and create a calm zone into which empties the end of oil supply tubing 40 which is fastened inside fixed housing 6 and which passes axially through the inside of hollowed central shaft 2.

Reference numeral 41 denotes a radial bore in the shaft 2. Reference numerals 43 and 44 denote tubings in housing 6. Reference numeral 45 denotes a chamber containing bearing 23.

The operation of the lubricating device of the invention will be described below.

Shafts 1 and 2 revolve (in direction of arrow 60 in FIG. 4) while the cooling air from a preliminary compression stage or from the blower moves longitudinally in the direction of arrow 50 (FIG. 1) through hollow shafts 1 and 2 and passes through openings including openings 41 to cool certain parts of the turbojet or exert a counterpressure at the labyrinth joints.

Oil arrives by drops through tubing 40 and strikes annular groove 38. Under the effect of centrifugal force, the oil penetrates into radial bores 37 provided in the shaft 2 and into coaxial bores 36 of ring portion 31. The oil squirting through the bores 36 is driven by the air rushing into cells 34 from the central flow of cooling air through the radial openings 41 in shaft 2 of the low pressure assembly. These openings 41 lie upstream of cells 34. The oil and air form a mist as they leave atomizing orifice 35. The mist passes over bearing 23, lubricating and cooling it, before being evacuated into an ejection channel through spaces 45 and 42, tube 43, and central tube 44. The circumferentially inclined orientation of the cells with respect to the axis of rotation, together with their tapered shape, cause an acceleration of the air in the ring portion 31, encouraging atomization of the oil entering through bores 36.

A portion of the air delivered through openings 41 is centrifugally driven against the outer wall of chamber 45 containing bearing 23 and through bores 46 and 47, creating counterpressure at labyrinth joint 28 before being evacuated along the same path as the lubricating mist. The layer of air thus formed on the wall of the chamber 45 ensures an effective insulation of the bearings against heat transfer from the stream of hot gas passing the rotor blades, thereby contributing to a satisfactory overall thermal balance.

Obviousuly, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a turbojet having inner and outer concentric hollow shafts rotatable about an axis of rotation in a first direction, and at least one bearing positioned between said shafts for permitting relative rotation between said shafts, a system for lubricating and cooling said at least one bearing, said system comprising:

a first ring having a radially inner portion mounted on a radially outer surface of said inner shaft and being positioned upstream of said at least one bearing relative to the direction of flow of air through said turbojet;

a plurality of circumferentially spaced cells in said first ring, each of said cells being open at the upstream end of said first ring and having lengths extending into said first ring;

an atomizing orifice extending between the downstream end of each said cell and the downstream end of said first ring, each said orifice being directed toward said at least one bearing;

a first radial bore for each of said cells, each said first bore extending through said inner portion of said first ring to one of said cells;

a second radial bore in said inner shaft for each said first bore, each said second bore being coaxial with one of said first bores;

an annular groove on an inner wall of said inner shaft, each of said second bores opening into said groove;

fixed tube means for supplying lubricating fluid to said groove; and means for supplying pressurized air to said upstream end of said first ring, whereby lubricating fluid is supplied to said cells via said groove and coaxial bores, said lubricating fluid mixing with said pressurized air in said cells and being atomized in said orifice and discharged towards said at least one bearing.

2. The system of claim 1 wherein said cylindrical ring includes crests that form a labyrinth joint in conjunction with an inner surface of said outer shaft.

3. The system of claim 1 including a coaxial second ring surrounding said first ring, the outer surface of said second ring including crests that form a labyrinth joint in conjunction with an inner surface of said outer shaft.

4. The system of claim 1 wherein said lengths of said cells are circumferentially inclined from the direction of said axis of rotation of said shafts, said inclination of said lengths extending from upstream to downstream with a sense opposite that of said first direction.

5. The system of claim 1 wherein the circumferential width of each of said cells decreases from said upstream end of said ring towards said downstream end of said ring.

6. The system of claim 4 wherein the circumferential width of each of said cells decreases from said upstream end of said ring towards said downstream end of said ring.

7. The system of claim 1 including a body of revolution shaped approximately like a truncated cone fixed to an upstream portion of said inner surface of said inner shaft to deflect the flow of cooling air passing through said inner shafts and to create a calm zone into which an end of said tube means empties.

8. The system of claim 1 including a stop collar mounted on an outer surface of said inner shaft to secure said at least one bearing against said first ring.

* * * * *